(12) United States Patent
Rowe

(10) Patent No.: US 9,737,981 B2
(45) Date of Patent: Aug. 22, 2017

(54) UNIVERSAL JOINT DISMANTLING TOOL

(71) Applicant: PRO TOOLS, LLC, Menasha, WI (US)

(72) Inventor: Carl Rowe, Menasha, WI (US)

( * ) Notice: Subject to any disclaimer, the term of this patent is extended or adjusted under 35 U.S.C. 154(b) by 203 days.

(21) Appl. No.: 14/341,175

(22) Filed: Jul. 25, 2014

(65) Prior Publication Data
US 2016/0023334 A1 Jan. 28, 2016

(51) Int. Cl.
*B23P 19/027* (2006.01)
*B25B 27/06* (2006.01)
*F16D 3/40* (2006.01)
*B25B 27/02* (2006.01)

(52) U.S. Cl.
CPC .......... *B25B 27/062* (2013.01); *B25B 27/026* (2013.01); *F16D 3/405* (2013.01)

(58) Field of Classification Search
CPC .......... B23Q 1/0018; B23Q 1/00; B23Q 1/03; B23Q 1/25; B23Q 3/00; B23Q 3/082
See application file for complete search history.

(56) References Cited

U.S. PATENT DOCUMENTS

| | | | |
|---|---|---|---|
| 2,807,081 A | 9/1957 | Black | |
| 3,069,761 A * | 12/1962 | Sommer | B25B 27/026 254/93 R |
| 3,813,755 A | 6/1974 | Maskell et al. | |
| 4,249,293 A | 2/1981 | Schulberg | |
| 4,570,319 A | 2/1986 | Skoworodko | |
| 4,805,281 A | 2/1989 | Stark | |
| 4,977,660 A | 12/1990 | Maynard | |
| 5,050,285 A | 9/1991 | Wrage | |
| 5,163,210 A | 11/1992 | Lostra | |
| 5,220,716 A | 6/1993 | Lostra | |
| 5,347,692 A | 9/1994 | Ebata | |
| 5,836,078 A | 11/1998 | Aiken | |
| 5,988,955 A | 11/1999 | Curtis | |
| 6,226,846 B1 | 5/2001 | Watson | |
| 6,415,487 B1 * | 7/2002 | Leimer | B25B 27/10 29/213.1 |
| 6,526,641 B1 * | 3/2003 | Latham | B25B 27/026 254/18 |
| 7,356,899 B1 | 4/2008 | Jantzer | |
| 7,496,999 B2 * | 3/2009 | Robarge | B25B 13/48 29/255 |
| 7,698,795 B2 * | 4/2010 | Brock | B25B 27/0035 29/255 |
| 2011/0133139 A1 | 6/2011 | Betcher et al. | |

(Continued)

OTHER PUBLICATIONS

Puller Attachments product sheet, Power Team Catalog, www.powerteam.com, p. 200, retrieved 2014.
(Continued)

*Primary Examiner* — Lee D Wilson
(74) *Attorney, Agent, or Firm* — Smith Keane LLP

(57) ABSTRACT

A universal joint (U-joint) dismantling tool includes an actuator coupled to a yoke. The yoke has two substantially parallel legs, spaced to form a pull channel therebetween. Each yoke leg terminates in a free end defining a foot surface. The actuator is adapted to substantially linearly draw a puller at least partially along a length of the yoke pull channel, thereby increasing a distance between a pull surface and the yoke foot surfaces.

11 Claims, 12 Drawing Sheets

(56) References Cited

U.S. PATENT DOCUMENTS

2016/0023334 A1* 1/2016 Rowe .................. B25B 27/062
29/426.5

OTHER PUBLICATIONS

Push-Pullers® product sheet, Power Team Catalog, www.powerteam.com, pp. 214-215, retrieved 2014.
International Search Report and Written Opinion of the International Searching Authority, International Application No. PCT/US2015/042284.
Tiger Tool International Incorporated, Heavy Duty Truck & Automotive Tools Product Catalog, 8th Edition [online] Jan. 20, 2011 [retrieved on Oct. 30, 2015] <URL: http://dsuban.com/website_docs/tigertool/Tiger_Tool_Catalog_8th_Edition_Web.pdf>.

\* cited by examiner

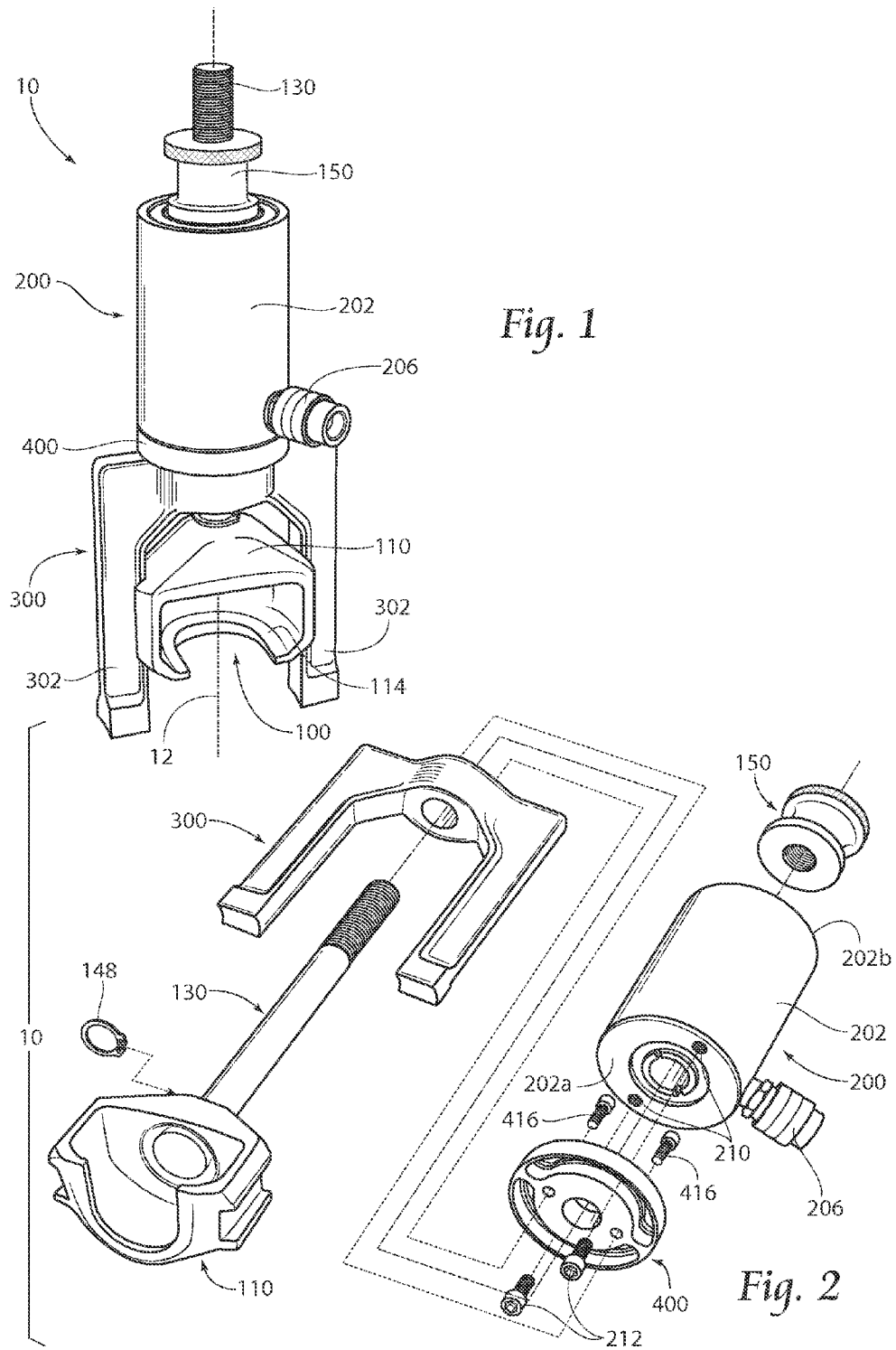

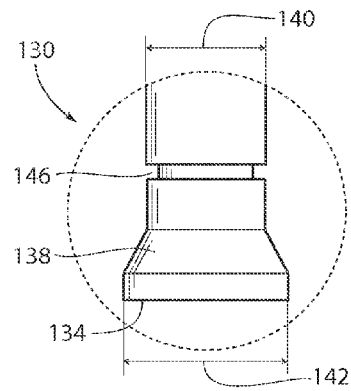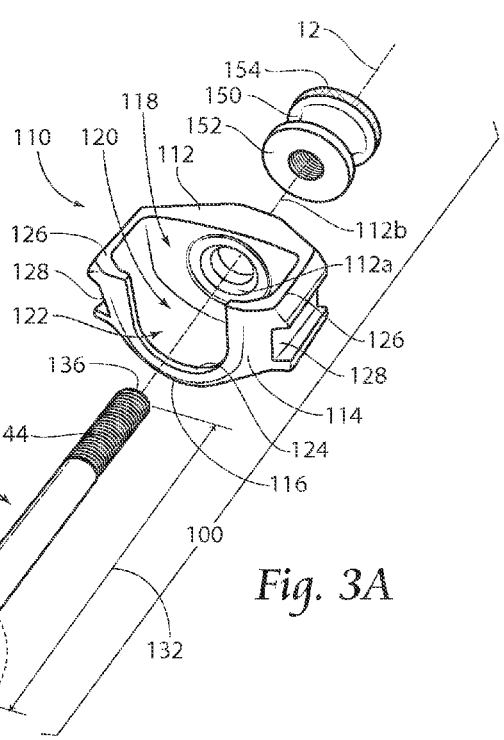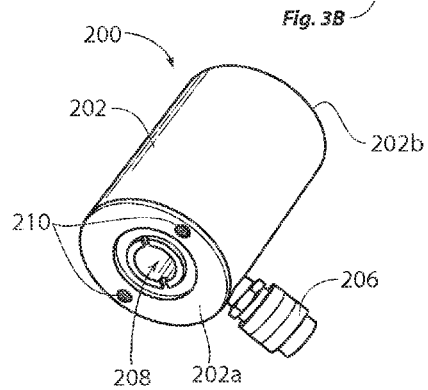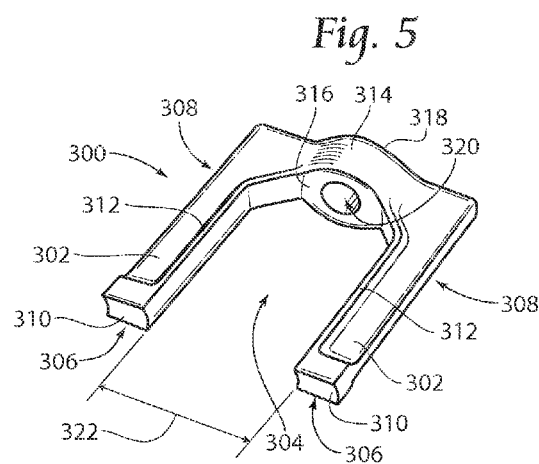

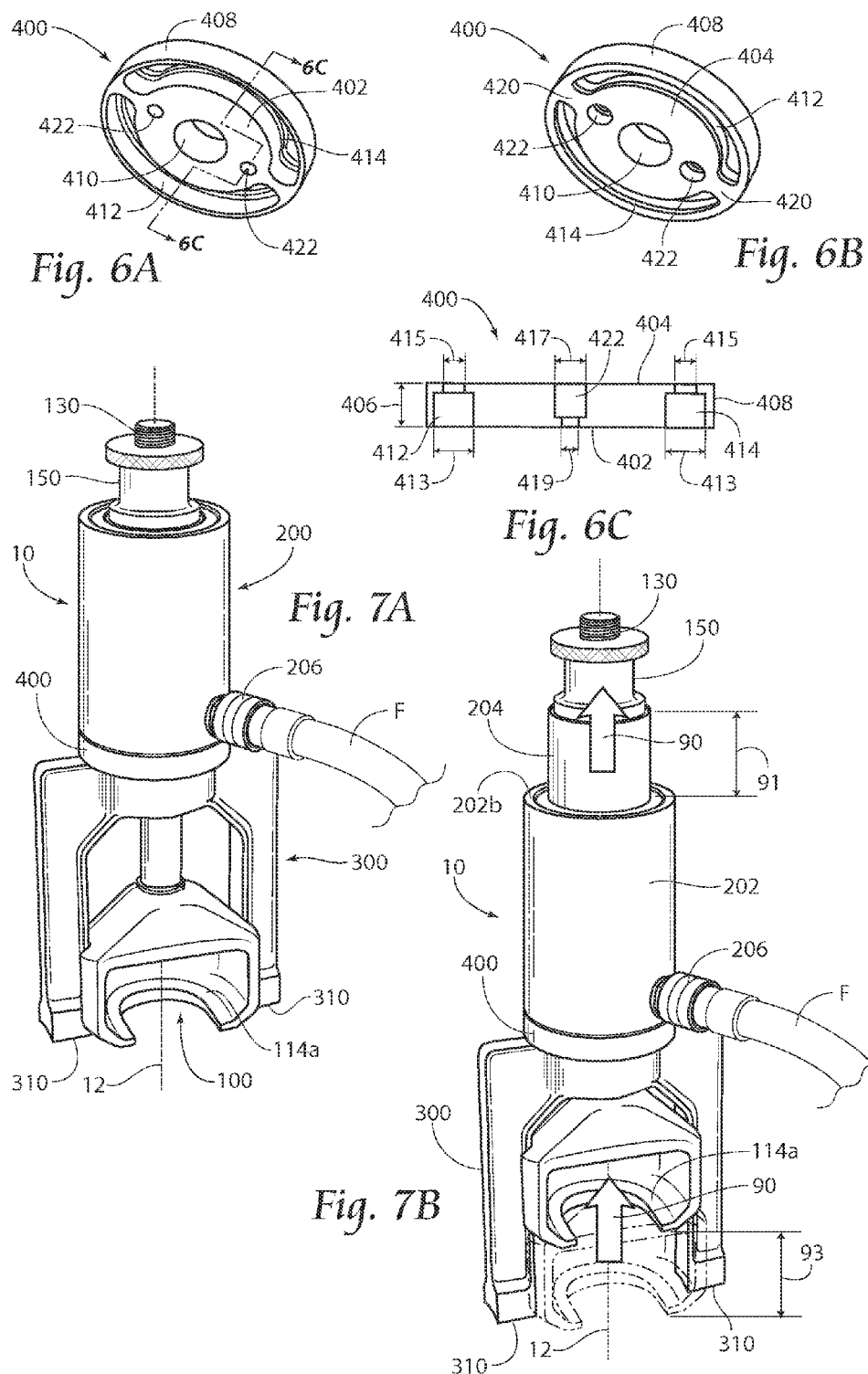

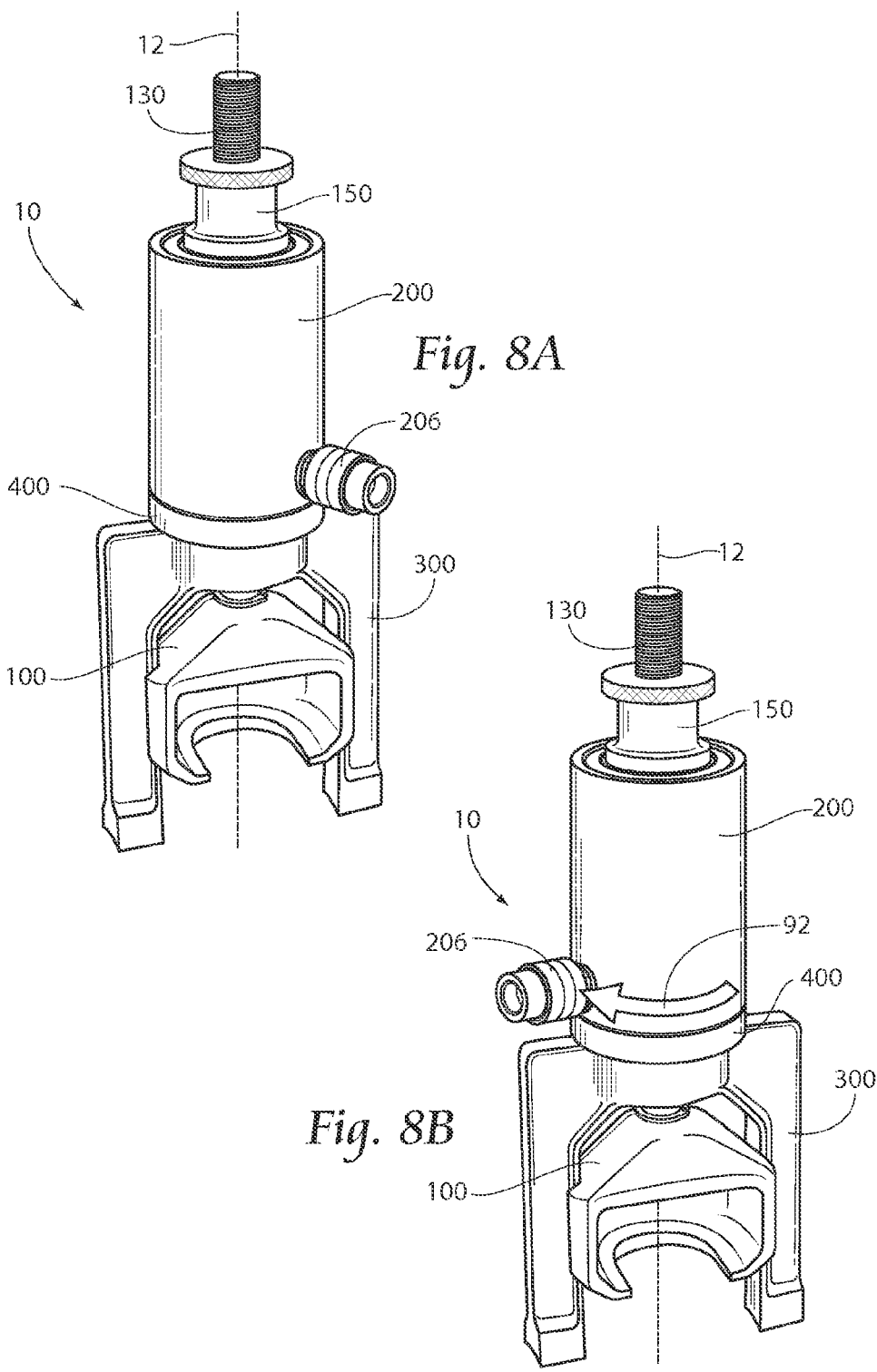

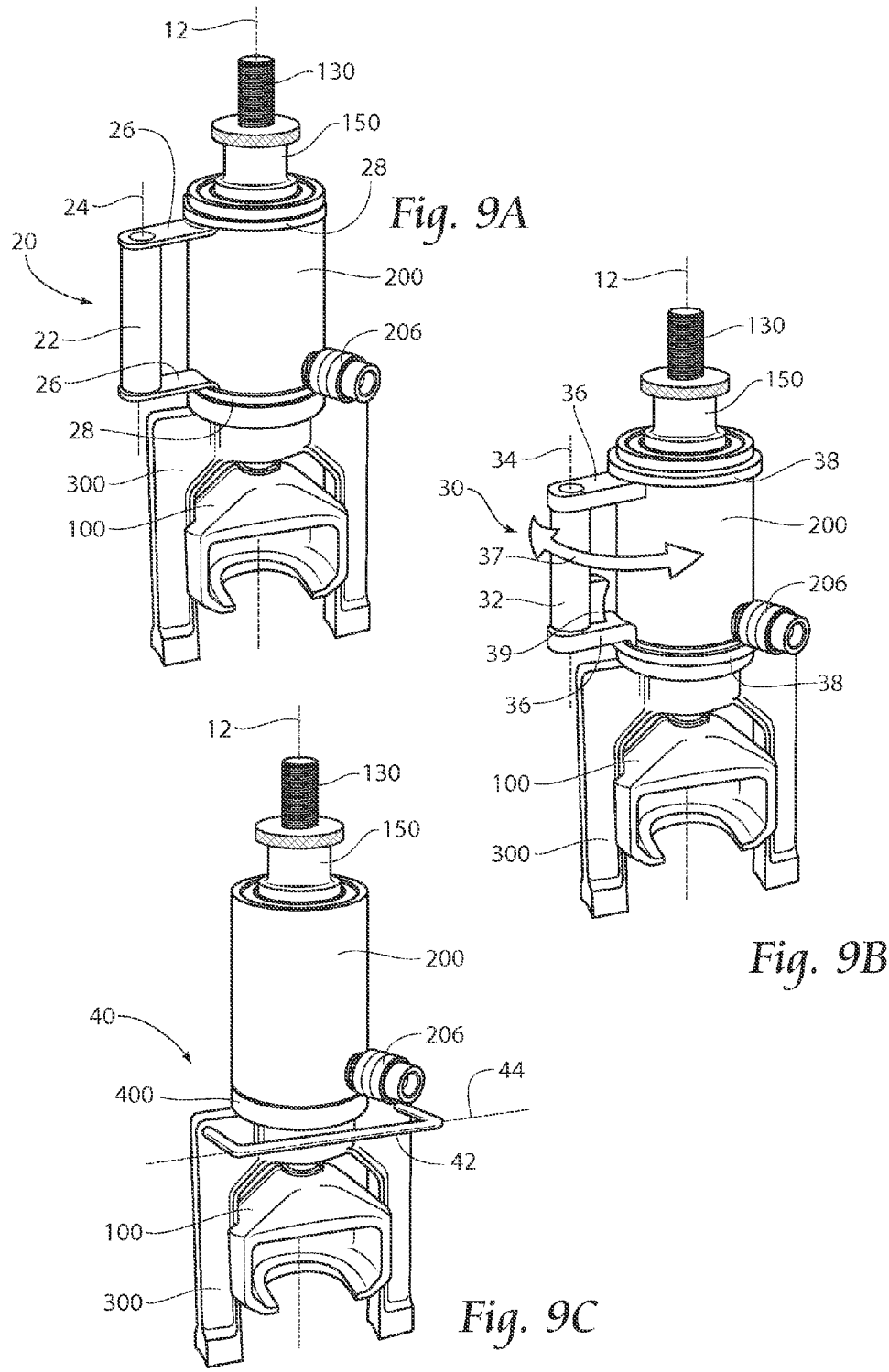

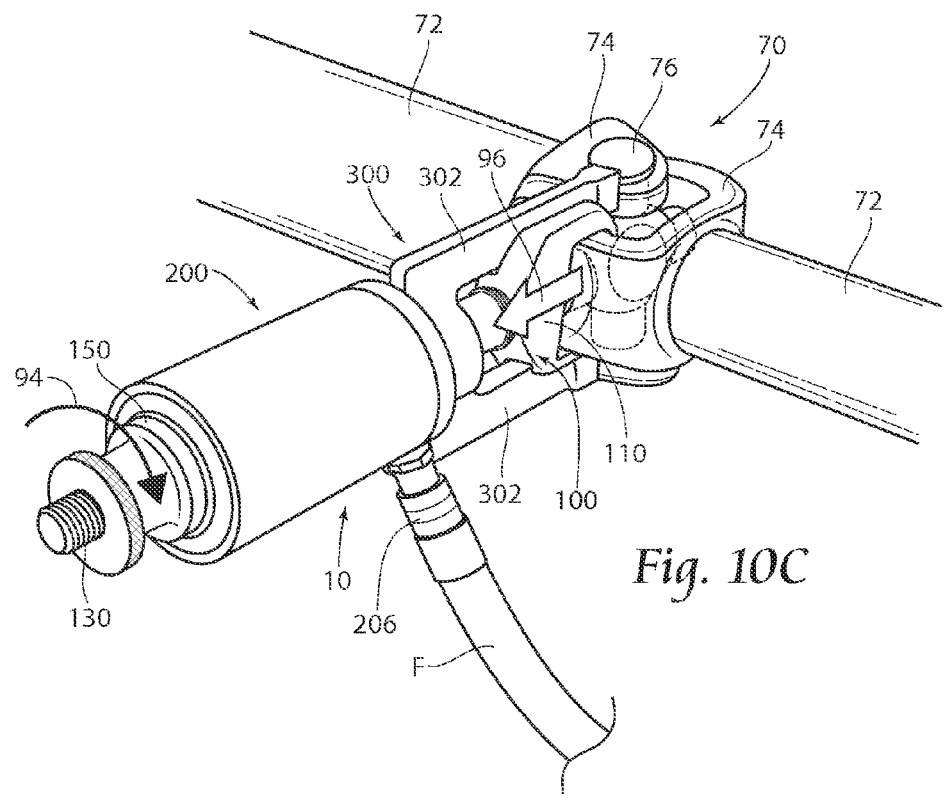
Fig. 10C
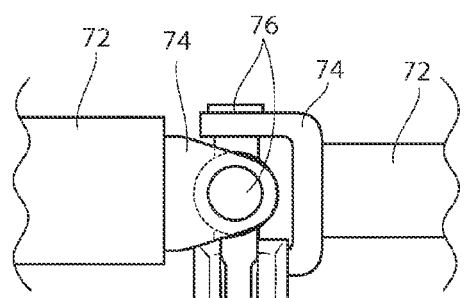
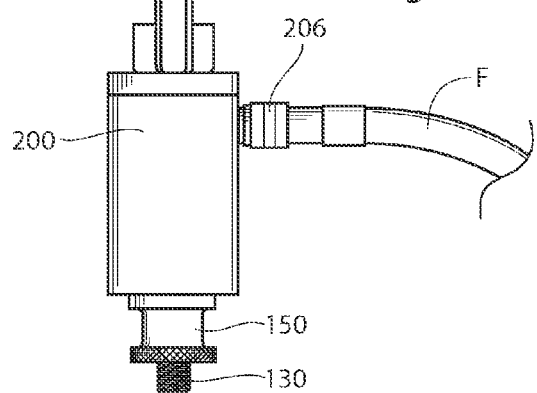
Fig. 10D

UNIVERSAL JOINT DISMANTLING TOOL

BACKGROUND OF THE INVENTION

Essential to the drive train in many vehicles, a universal joint can present a challenge to persons needing to service such vehicles. For instance, prior to towing a vehicle with its drive wheels on the ground, it is necessary to decouple the drive shaft from the transmission. A drive shaft should be disconnected from the transmission so as to prevent damage to the transmission.

The most common way to disconnect a drive shaft from a transmission is to dismantle a universal joint ("U-joint") portion of the drive train, thereby separating one part of the drive shaft from another. Prior devices have been used to perform this function, albeit sometimes extremely difficultly. For instance, expired U.S. Pat. No. 4,570,319, to Skoworodko, which is incorporated herein by reference in its entirety, discloses a manual U-joint dismantling tool.

However, the art of vehicle servicing could still benefit from an automated U-joint dismantling tool, which greatly decreases frustration that may be experienced using former tool designs.

SUMMARY OF THE INVENTION

Systems and methods according to the present invention provide an automated U-joint dismantling tool to aid in the separation of drive shaft portions.

Generally, a system according to the present invention includes a yoke, a puller, and a powered actuator. The yoke preferably has a first longitudinal leg and a second longitudinal leg coupled by a bridge member. The puller preferably includes a cup disposed between the first longitudinal leg and the second longitudinal leg. The powered actuator is preferably coupled to the bridge and interfaces the puller so as to draw the cup towards the bridge when the actuator is activated.

According to one aspect of a yoke according to the present invention, the first longitudinal leg may extend from a first free foot end to a first mounted hip end, the first free foot end including a first terminal foot surface. The second longitudinal leg may extend from a second free foot end to a second mounted hip end, the second free foot end including a second terminal foot surface. The bridge portion preferably couples the first mounted hip end to the second mounted hip end. The first longitudinal leg may be disposed at least substantially parallel to and spaced diametrically across a gap from the second longitudinal leg.

According to an aspect of a puller according to the present invention, the puller may have a first end and a second end, with a cup being disposed at the first end and being longitudinally moveable along a pulling axis, the pulling axis being at least substantially parallel to the first and second longitudinal legs. The puller preferably includes a shaft extending through the cup and through the bridge member towards the second end along the pulling axis. A knob is coupled to (e.g., threadably engaged with) the shaft, preferably closer to the second end than the first end. The knob may have an engagement surface that may be at least substantially planar.

According to an aspect of an actuator according to the present invention, the actuator may be a linear actuator. Preferably, the actuator is a fluid powered actuator that operates using pressurized air, water, and/or oil. The actuator may be disposed on a first side of the bridge member, and the first and second longitudinal legs may extend from a second side of the bridge member opposite the first side.

According to another aspect of an actuator according to the present invention, the actuator includes a piston moveable along the pulling axis from a first position to a second position through a pulling distance, wherein the first position is closer to the bridge than the second position. The piston preferably cooperates with the knob to cause the cup to travel the pulling distance. The piston may have a substantially planar engagement surface disposed perpendicular to a throughbore situated coaxial to the pulling axis, the engagement surface abutting the knob.

According to still another aspect of an actuator according to the present invention, the actuator includes a cylindrical housing rotatable about the pulling axis, the housing being coupled to the yoke by a plurality of threaded fasteners extending through a coupling disk integrally formed with the yoke.

A method according to the present invention includes the steps of providing a tool, placing the tool in contact with a universal joint (U-joint) and then operating the tool to cause separation of parts of the joint. The tool includes a yoke, a puller and a powered actuator. The yoke has a pair of legs that are placed against a first portion of the U-joint. The puller has a cup that is placed against a second portion of the U-joint. The actuator imparts linear translation to the cup by acting on the puller. Thus, the distance between the cup and free ends of the yoke legs is increased. As a result of the translation, a cap of a bearing cup of the U-joint may become dislodged, thereby easing disassembly of the joint. The dislodged cap may be safely retained by a patch (e.g. leather) and elastic retainers (e.g. bungee cords).

A kit according to the present invention may provide components to be added to previously existing parts to make a tool according to the present invention. The kit may include a disk circumferentially formed about a central axis, the disk having a number N of mounting throughholes formed parallel to the central axis and a slot formed through the disk. A powered actuator may be included in the kit, the actuator including a mounting aperture. A number N of mounting fasteners may be provided in the kit, where the mounting fasteners are configured to be inserted into the mounting throughholes. Also in the kit there may be provided an actuator mounting fastener configured to be inserted through the slot and be threadingly engaged with and bottom out in the mounting aperture so as to be moveable within the slot.

According to another embodiment of a kit according to the present invention, the kit may further include a second slot formed through the disk and a second actuator mounting fastener configured to be inserted through the second slot and be threadingly engaged with and bottom out in a second mounting aperture formed in the powered actuator so as to be moveable within the second slot.

BRIEF DESCRIPTION OF THE DRAWINGS

FIG. 1 is a perspective view of an embodiment of a tool according to the present invention.

FIG. 2 is an assembly view of the embodiment of FIG. 1.

FIG. 3A is a partial assembly view of an embodiment of a joint puller according to the present invention.

FIG. 3B is an elevation view of a portion of a puller shaft according to the present invention.

FIG. 4 is a perspective view of an embodiment of an actuator according to the present invention.

FIG. 5 is a perspective view of an embodiment of a tool yoke according to the present invention.

FIG. 6A is a bottom perspective view of an embodiment of a coupling plate according to the present invention.

FIG. 6B is a top perspective view of the embodiment of FIG. 6A.

FIG. 6C is a cross-section view taken along line 6C-6C of FIG. 6A.

FIG. 7A is a perspective view of the embodiment of FIG. 1 in a deactivated position.

FIG. 7B is a perspective view of the embodiment of FIG. 1 in an activated position.

FIG. 8A is a perspective view of the embodiment of FIG. 1 in a first fluid-operative position.

FIG. 8B is a perspective view of the embodiment of FIG. 1 in a second fluid-operative position.

FIG. 9A is a perspective view of a second embodiment of a tool according to the present invention.

FIG. 9B is a perspective view of a third embodiment of a tool according to the present invention.

FIG. 9C is a perspective view of a fourth embodiment of a tool according to the present invention.

FIG. 10C is a perspective view of a puller positioning step of a universal joint dismantling method according to the present invention.

FIG. 10D is a top plan view showing the effect of the puller positioning step.

DESCRIPTION OF THE PREFERRED EMBODIMENT

Figure 9D:
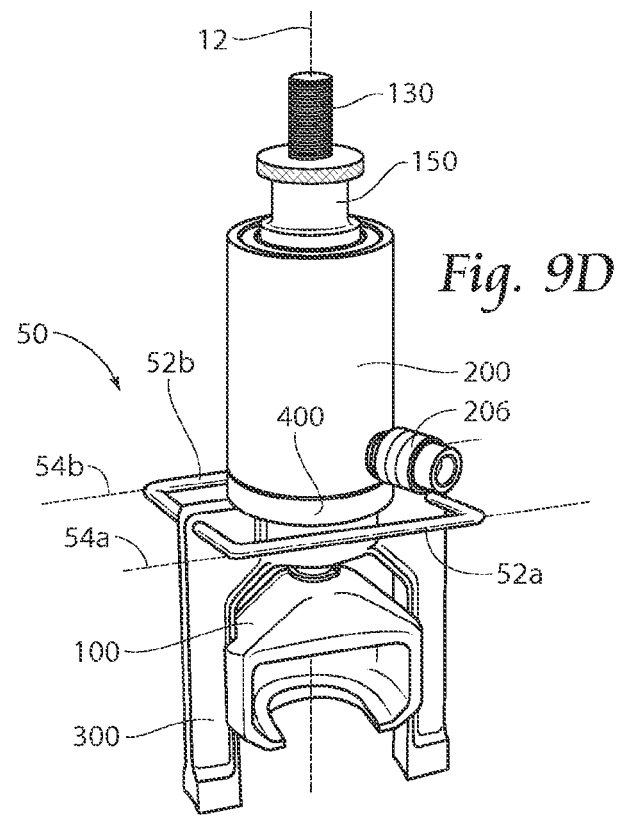
FIG. 9D is a perspective view of the embodiment of FIG. 9C, further including a second yoke handle.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Turning now to the figures, FIG. 1 depicts a first embodiment 10 of a tool according to the present invention. Generally, the tool 10 includes a puller 100 driven along a pulling axis 12 by an actuator 200, which is coupled to a yoke 300. With reference to FIGS. 1, 2, and 3A-B, the puller 100 includes a cup 110, a shaft 130, and a knob 150. The cup 110 includes a top wall 112, a bottom wall 114, and a rear wall 116, which couples the top wall 112 and the bottom wall 114. The top wall 112 includes a tapered throughbore 112a formed therethrough, adapted to receive the shaft 130. The cup 110 defines a front opening 118 extending into a cavity 120 formed between the top wall 102 and the bottom wall 104. Also extending into the cavity 120 is a bottom opening 122, formed through the bottom wall 104 and adjoining the front opening 118. The bottom opening 122 is preferably formed by a substantially U-shaped channel 124 formed into the bottom wall 114, where the open portion of the U-shape intersects the front opening 118 and the closed portion of the U-shape extends towards the rear wall 106. The channel 124 is preferably symmetrically arranged perpendicular to a plane extending along a top wall throughbore axis 112b and at least substantially parallel to the sides of the channel 124. The cup 110 may further include one or more side walls 126 extending between the top wall 112 and the bottom wall 114. The inside surfaces of the side walls 126 may further define the cavity 120, along with the inside surfaces of the top wall 112, bottom wall 114, and rear wall 116. The inside surface of the bottom wall 114 defines a pulling surface 114a, at least substantially along the entire U-shaped channel 124. Each side wall 126 may include a registration race 128 or other guidance structure to interface with the yoke 300. The cup 110 is preferably formed as a unitary member cast of or machined from a metal material, such as steel or cast iron.

The shaft 130 of the puller 100 extends along a shaft length 132 from a bottom end 134 to a top end 136. The bottom end 134 is preferably provided with a flange 138, which may be shaped to substantially mate with a surface provided on the cup 110. The shaft 130 has a diameter 140 that is preferably less than a diameter 142 of the flange 138. Provided along a length of the shaft 130, preferably extending from the top end 136 towards the bottom end 134 are threads 144. The threads 144 are preferably formed into the shaft 130, such that the shaft diameter 140 is the greatest diameter provided from the top end 136 through a majority of the length 132 of the shaft 130. An annular retainer slot 146 is preferably formed into the shaft 130 at a longitudinal location that is closer to the bottom end 134 than the top end 136. The slot 146 is adapted to receive a split retaining ring 148. When assembled, the retaining ring 148 and flange 138 preferably restrict longitudinal movement of the cup 110 along the shaft 130. There may be applications of the tool 10 in which it does not matter if the cup 110 travels along the shaft 130 for a greater than nominal distance, in which case a retainer slot 146 and/or ring 148 may not be required. To assemble the cup 110 to the shaft 130, the top end 136 of the shaft 130 is inserted through the cup cavity 120 and through the throughbore 112a in the cup top wall 112 and the cup 110 comes to rest against the flange 138. If a retaining ring 148 is used, it is thereafter snapped into the retainer slot 146 provided on the shaft 130. The shaft 130 is preferably formed as a unitary member cast of or machined from a metal material, such as steel or cast iron.

The knob 150 is preferably selectively positionable along a length of the shaft 130. The knob 150 is preferably a cylindrical member, preferably composed of a unitary piece of metal (e.g., steel, which may be stainless), having a bottom knob surface 152 and a top knob surface 154, one or both of which may be at least substantially planar. One method for achieving selective positioning of the knob 150 along the shaft 130 is through the use of a threaded relationship. That is, the knob 150 may be provided with a threaded throughbore 156 adapted to mate with the threads 144 provided on the shaft 130. Alternative positioning of the knob 150 is contemplated, such as by using an indexed relationship, whereby the shaft 130 may be provided with one or more contra-axial throughbores (not shown) that may receive a pin (not shown) adapted to couple the knob 150 to the shaft 130 at a selected discrete location. The knob 150 is preferably formed as a unitary member cast of or machined from a metal material, such as steel or cast iron.

With reference to FIGS. 1, 2 and 4, the actuator 200 preferably includes a cylinder extending between a substantially planar bottom surface 202a and a substantially planar top surface 202b. The actuator includes a plunger or piston 204 (see FIG. 7B), which is selectively extendable along the pulling axis 12. At least a portion of the plunger 204 may extend longitudinally outside of the cylinder 202 when the actuator 200 is activated, but the plunger 204 preferably rests completely within the bounds of the cylinder 202 when the actuator 200 is completely deactivated. The actuator 200 is preferably a fluid operated cylinder or ram having at least one fluid port 206, adapted to receive a pressurized fluid, such as air, oil, water, or a combination thereof (e.g. air over hydraulic). Extending through and substantially coaxial with the cylinder 202 and plunger 204 is a throughbore 208. Mounting holes 210, preferably threaded, are provided in the bottom surface 202a of the cylinder 202 to receive threaded fasteners 212 for coupling the actuator 200 to the yoke 300.

The yoke 300, as can be seen with reference to at least FIGS. 1, 2, and 5, generally includes a pair of longitudinal legs 302, which are preferably substantially parallel and disposed on either side of a puller gap 304. The legs 302 extend from a free foot end 306 to a mounted hip end 308. Each foot end 306 includes a terminal foot surface 310, which may be radiused, where such radius is preferably parallel to the longitudinal direction of the respective leg 302 and/or parallel to the pulling axis 12. On a side of each leg 302 that interfaces the puller gap 304, a puller guide rail or surface 312 is preferably provided. The legs 302 are joined at their hip ends 308 by a bridge 314. The bridge 314 may be a substantially cylindrical, preferably solid piece of material extending from a bottom bridge surface 316, which interfaces the pulling gap 304, and a top bridge surface 318. Formed through the bridge 314 is a bridge throughbore 320. The throughbore 320 extends through the bottom bridge surface 316 and the top bridge surface 318, either or both of which are preferably at least substantially planar surfaces. The throughbore 320 is preferably a smooth throughbore, but in some instances (e.g., a retrofit), the throughbore may contain threads that may be ignored for the use of the tool 10. Regardless of whether threads are present or not, the throughbore 320 preferably has an internal, open diameter that is larger than the diameter 140 of the shaft 130. The puller gap 304 has a width 322 adapted to straddle a yoke arm 74 a U-joint 70 on which the tool 10 is intended to be used (see FIG. 10A). The yoke 300 is preferably formed as a unitary member cast of or machined from a metal material, such as steel or cast iron.

With reference to FIGS. 2 and 6A-C, a coupling disk 400 can be seen. The disk 400 is preferably a cylindrical member extending between a disk bottom surface 402 and a disk top surface 404, through a substantially uniform disk thickness 406. An outer curviplanar, preferably imperforate surface 408 spans the disk thickness 406. At least a portion of the disk bottom surface 402 is adapted to mate with the top bridge surface 318, so the disk bottom surface 402 may be planar if the top bridge surface 318 is planar. Formed through the disk 400, preferably at least substantially perpendicular to planar bottom disk surface 402 and planar top disk surface 404, is a disk throughbore 410. The disk throughbore 410 has a diameter that is preferably substantially equal to the actuator throughbore 208, but in any event is larger than the diameter 140 of the shaft 130. The disk bottom surface 402 is preferably provided with one or more countersunk pivot slots 412,414 formed therein. The slots 412,414 extend through the disk top surface 404, too, but they are countersunk to the extent that a width 413 at the disk bottom surface 402 is greater than their width 415 at the disk top surface 404. Each slot 412,414 is adapted to receive the threaded fasteners 212 to be threaded into the openings 210 on the actuator 200. Where a plurality of slots 412,414 is provided, they are preferably separated by reinforcement ribs 420 that extend through the entire disk thickness 406. In an alternative embodiment of the disk 400, the bottom surface 402 may be solid over a majority of the slots 412,414, the slots 412,414 may be joined to form a complete circumferential channel, and the reinforcement ribs 420 removed so as to allow for 360 degree rotation of the fasteners 212 in such circumferential channel.

The disk top surface 404 is adapted to mate with the actuator 200, such as to mate with the cylinder bottom surface 202a. Formed into the top surface 404 is at least one, but preferably two countersunk throughbores 422. The throughbores 422 preferably have a larger diameter 417 at the disk top surface 404 and a smaller diameter 419 at the disk bottom surface 402. The throughbores 422 are adapted to receive threaded fasteners 416 which mate with threaded holes (not shown) formed in the top bridge surface 318. In this fashion, the coupling disk 400 may be secured, preferably immovably, to the yoke 300. The two throughbores 422 are preferably positioned diametrically opposed from each other about the disk throughbore 410. The coupling disk 400 is preferably formed as a unitary member cast of or machined from a metal material, such as steel or cast iron.

With focus now on FIG. 2, assembly of the tool 10 according to the present invention involves coupling the puller 100 to the actuator 200 and the actuator 200 to the yoke 300. The coupling disk 400 may first be securely fastened to the yoke 300. Threaded fasteners 416 are inserted through the countersunk throughbores 422 formed through the disk 400 and threaded into threaded holes (not shown) formed on the top bridge surface 318. These fasteners 416 are preferably tightened against the disk 400 thereby forcing the disk 400 into an immovably mounted relationship with respect to the yoke. The top end 136 of the shaft 130 is inserted through the throughbore 112a provided in the top wall 112 of the cup 110. The cup 110 is allowed to nest against the flange 138 of the shaft 130. If desired, the retaining clip or ring 148 is then longitudinally secured to the shaft 130 to prevent substantial travel of the cup 110 along the shaft 130.

The actuator 200 is coupled to the yoke 300. In this embodiment 10, threaded fasteners 212 are inserted through the pivot channels 412,414 in the disk 400 and mated with threaded apertures 210 on the cylinder 202. While these fasteners 212 may be securely tightened, so as to fix the actuator 200 in a substantially immovable relationship with the disk 400 and, in turn, the yoke 300, it is preferred to refrain from tightening the fasteners 212. In this fashion, although the cylinder 200 is coupled to the yoke 300, the cylinder 200 is left to freely rotate about the pulling axis 12.

The top end 136 of the shaft 130 is inserted through the actuator 200 and the knob 150 is threaded onto the shaft 300, or otherwise positioned thereon. The cup 110 is preferably positioned within the pulling gap 304 defined by the yoke 300, and may be rotatably registered by interfacing the registration race(s) 128 with the guide rail(s) 312 provided along the legs 302. Once this basic assembly is complete, the tool 10 is ready to be used.

FIGS. 7A and 7B generally demonstrate the operation of the actuator 200 on the puller 100 to cause substantially linear motion of the cup 110, and in particular to increase the distance between the pulling surface 114a of the cup 110 and the foot surfaces 310 of the yoke 300. A fluid supply F is coupled to the fluid port 206 and the tool 10 is or has been previously assembled as described above. Without actuation, the plunger 204 rests in the cylinder 202 of the actuator 200. Upon actuation, the plunger 204 extends from the cylinder 202, in a direction 90 along the pulling axis 12. The cylinder 202 acts on the bottom knob surface 152, the knob 150 being threadably engaged with the shaft 130. Due to the threaded engagement of the knob 150 and shaft 130, the movement of the knob 150 by the cylinder 204 causes movement of the shaft 130 in the same direction 90, which in turn causes the cup 110 to move along the pulling axis 12. Depending upon the amount of actuation, the plunger 204 will move a plunger distance 91 and the cup 110 will move along a cup distance 93, both of which are measured parallel to the pulling axis 12. Preferably, the plunger distance 91 is at least substantially identical to the cup distance 93.

It may be desirable to provide rotational positionability of the actuator 200 so as to allow ease of access to the fluid port 206 or otherwise to simplify positioning or operation. FIGS. 8A-8B provide first and second rotational positioning, respectively, of the cylinder 202 of the tool 10 with respect to the yoke 300. As indicated above, if the threaded fasteners 212 coupling the actuator 200 to the yoke 300 are not tightened, it will allow the actuator 200, or at least the cylinder 202 thereof, to rotate in a direction 92 about the pulling axis 12 to allow desired rotational positioning of the fluid port 206. Once desired rotational positioning of the fluid port 206 is achieved, the tool 10 may be used in that configuration or the threaded fasteners 212 may be securely tightened to prevent further rotation of the cylinder 202.

A cylindrical portion of a tool may be difficult to handle. FIGS. 9A-9E present different embodiments of tools according to the present invention, similar to the embodiment previously described, but further including one or more handles to aid in manipulation of the tool. A second embodiment 20 of a tool according to the present invention is shown in FIG. 9A. This embodiment 20 features a handle 22 disposed along a longitudinal handle axis 24, which is preferably substantially parallel to the pulling axis 12. The handle 22 is supported in a spaced relationship from the cylinder 202 by a support bracket 26 provided at each end of the handle 22. The brackets 26 are securely attached to the cylinder 202 with straps 28.

A third embodiment 30 of a tool according to the present invention is shown in FIG. 9B. This embodiment 30 features a handle 32 disposed along a longitudinal handle axis 34, which is preferably substantially parallel to the pulling axis 12. The handle 32 is supported in a spaced relationship from the cylinder 202 by a support bracket 36 provided at each end of the handle 32. Rather than being securely attached to the cylinder 202 like the brackets 26 of the second embodiment 20, the brackets 36 of this embodiment 30 are selectively positionable about the circumference of the cylinder 202. The brackets 36 are slidably engaged with circumferential tracks 38 which are secured to the cylinder 202. One or both of the brackets 36 may be statically positioned with respect to the tracks 38 by the use of a brake trigger 39, which causes frictional resistance to the movement of the handle 32.

It may additionally or alternatively be desirable to place a handle on the yoke 300. FIG. 9C depicts a fourth embodiment 40 of a tool according to the present invention. This embodiment 40 features a handle 42 disposed along a longitudinal handle axis 44, which is preferably substantially perpendicular to and non-coplanar with the pulling axis 12. The handle 42 may be formed in a general U-shape with the legs of the U-shape being secured (e.g. welded or cast) to the yoke 300 closer to the hip end 308 of the legs 302 than to the foot end 306.

FIG. 9D shows a fifth embodiment 50 of a tool according to the present invention, which is similar to the tool 40 of FIG. 9C. This embodiment 50 features a first handle 52a disposed along a longitudinal handle axis 54a, which is preferably substantially perpendicular to and non-coplanar with the pulling axis 12. The first handle 52a may be formed in a general U-shape with the legs of the U-shape being secured (e.g. welded or cast) to the yoke 300 closer to the hip end 308 of the legs 302 than to the foot end 306. This embodiment further includes a second yoke handle 52b disposed along a longitudinal handle axis 54b, which is preferably substantially perpendicular to and non-coplanar with the pulling axis 12, but is coplanar to the first axis 54b. The second handle 52b may be formed in a general U-shape with the legs of the U-shape being secured (e.g. welded or cast) to the yoke 300 closer to the hip end 308 of the legs 302 than to the foot end 306.

Figure 9E:
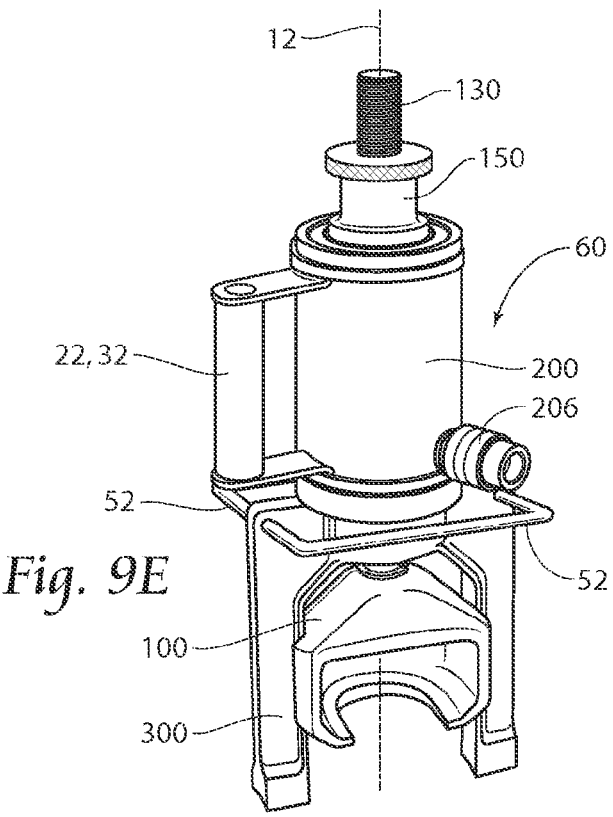
FIG. 9E is a perspective view of the embodiment of FIG. 9D, further including an actuator handle.

FIG. 9E depicts a sixth embodiment 60 of a tool according to the present invention, which features the handles 52 from FIG. 9D and the handle 22 or 32 from FIG. 9A or 9B respectively. Thus, an embodiment of a tool according to the present invention may include a handle that is rotatably secured 22 or translatable 32 with respect to the cylinder 202 and one or more handles 52 secured to the yoke 300.

Figure 10A:
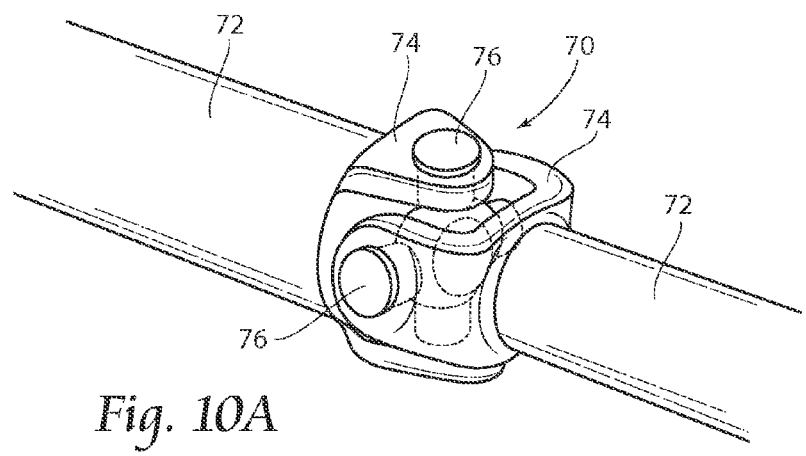
FIG. 10A is a perspective view of a universal joint.
Figure 10B:
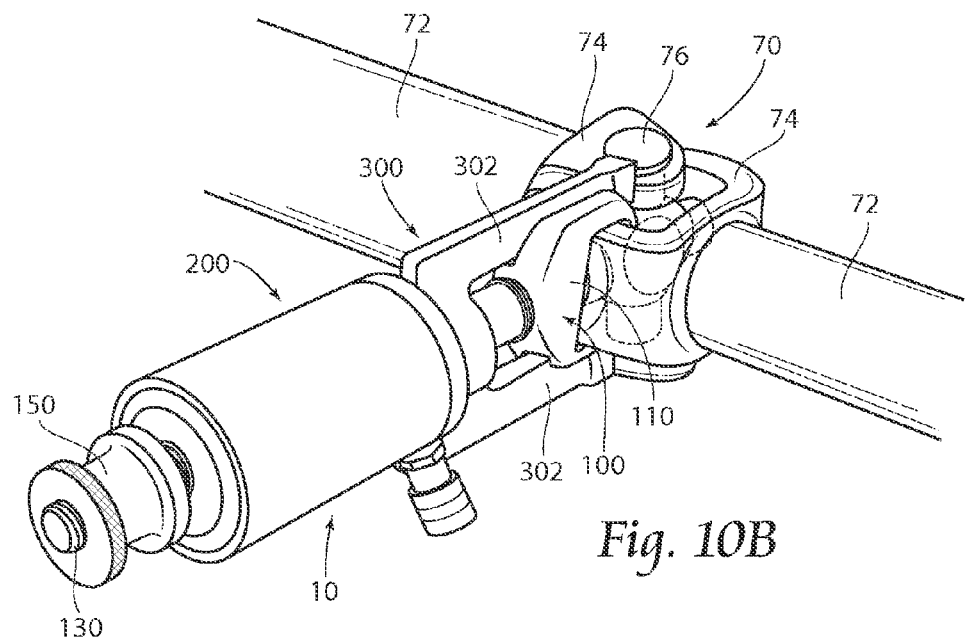
FIG. 10B is a perspective view of a tool positioning step of a universal joint dismantling method according to the present invention.

An operation of a tool according to the present invention to assist in dismantling a U-joint may be described with reference to FIGS. 10A-10F. FIG. 10A shows a standard universal joint 70, known in the mechanical arts to join two sections 72 of a drive shaft. The U-joint 70 generally includes two joint yokes 74 coupled together in substantially a 90-degree offset by a cruciform member. The cruciform member is held in position with bearing caps 76. To dismantle a U-joint, the most common method is to force one or more of the bearing caps 76 from engagement with the cruciform member. In a positioning step, as seen in FIG. 10B, a tool 10 according to the present invention may be provided in an assembled state, as previously discussed. The knob 150 may be engaged with the shaft 130 so as to provide at least partially free longitudinal movement of the shaft 130 through the cylinder 202 such that the cup 110 may be arranged to receive an arm of a first joint yoke 74 into the cavity 120 thereof. The foot ends 310 of the yoke arms 302 are positioned against the arms of the other joint yoke 74. As shown in FIG. 10C, the cup 110 is drawn in a pulling direction 96 by tightening the knob 150 on the shaft 130 by rotating the knob 150 in a tightening direction 94. This action draws the knob 150 into contact with the actuator plunger 204, the pulling surface 114a of the cup 110 into contact with the arm of the first joint yoke 74, and the foot surfaces 310 of the yoke arms 302 into contact with the arms of the second joint yoke 74. After or before the knob tightening step shown in FIG. 10C, a fluid supply line F may be placed in fluid connection with the fluid port 206 of the actuator 200. FIG. 10D is a top view of the arrangement of the tool 10 having been positioned in accord with the above two steps.

Figure 10E:
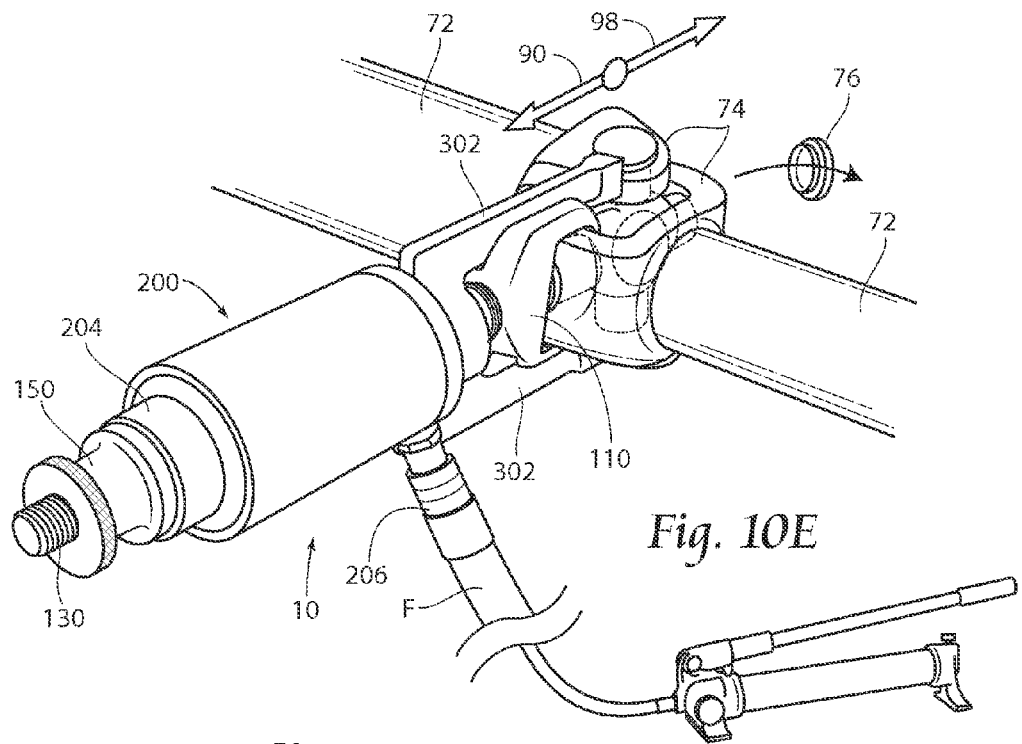
FIG. 10E is a perspective view of a pulling step of a universal joint dismantling method according to the present invention.
Figure 10F:
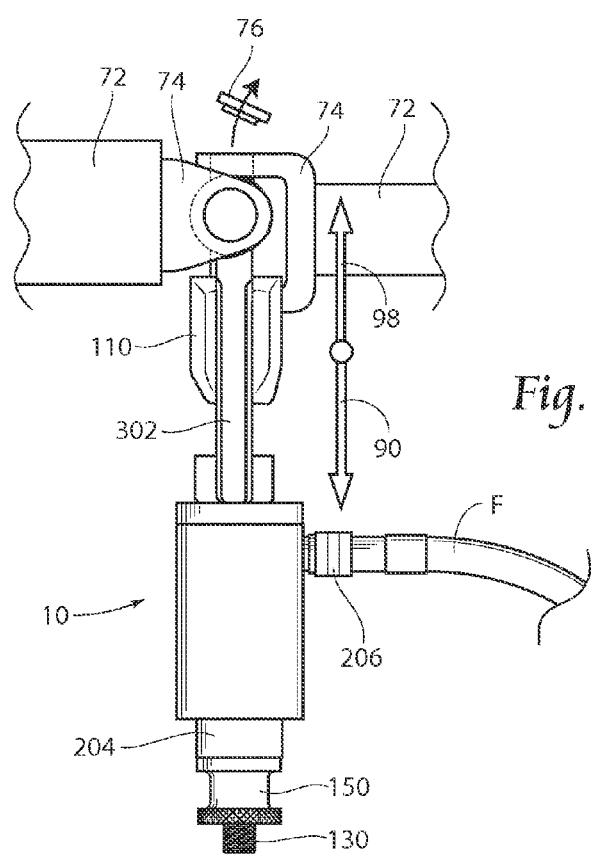
FIG. 10F is a top plan view of the pulling step of FIG. 10E.

FIGS. 10E-10F show the use of the tool 10 to remove a bearing cap 76 from the U-joint 70. Pressure is provided through the fluid line F, such as through an automatic or manual fluid pump or compressor. Such pressure forces the plunger 204 to move in the pulling direction 90. The cup 110 thus draws the first joint yoke in the pulling direction 90 while the tool yoke arms 302 maintain position or force in a pushing direction 98 the arms of the second joint yoke 74. Regardless of whether either joint yoke 74 moves with respect to an environmental reference (e.g. workbench or earth) the first joint yoke 74 (engaged by the cup 110) moves in a first direction 90 and the second joint yoke 74 (engaged by the tool yoke arms) moves in a second opposite direction. The eventual result of such movement is the dislodgement of a bearing cap 76 from the cruciform member, thereby allowing easier dismantling of the U-joint 70.

Figure 11:
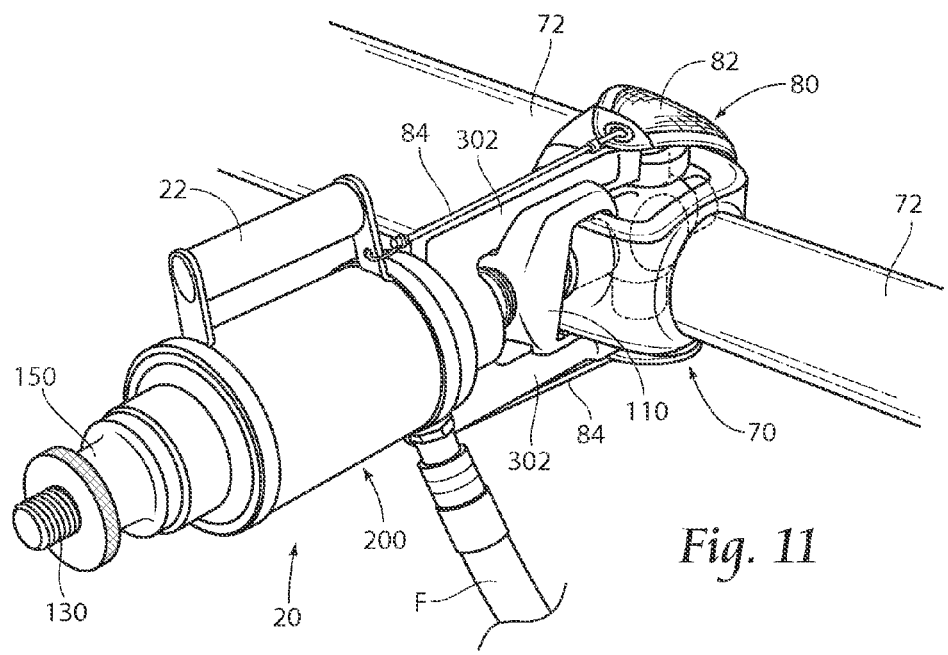
FIG. 11 is a perspective view of the view shown in FIG. 10E, further including a safety device in operative cooperation with the embodiment of FIG. 9A.
Figure 12:
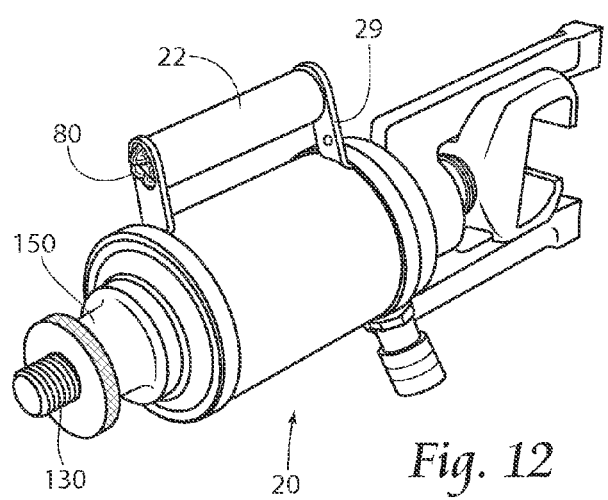
FIG. 12 is a perspective view of the embodiment of the tool of FIG. 9A, further including the safety device of FIG. 11 shown stuffed in the handle.

FIG. 11 shows the second embodiment of the tool 20 previously described, further including a bearing cap safety device 80 for containing a popped bearing cap 76. The safety device 80 generally includes a patch of flexible material 82, such as leather or canvas, coupled to the tool 20 such as by using elastic retaining members 84 hooked to the handle 22, bracket 26 or an aperture 29 specifically suited for same. The patch of material 82 is generally placed to cover the bearing cap 76 intending to be removed by the use of the tool 20. FIG. 12 shows the safety device 80 having been disconnected from the tool 20 and folded or rolled up for storage in the handle 22 thereof.

Figure 13:
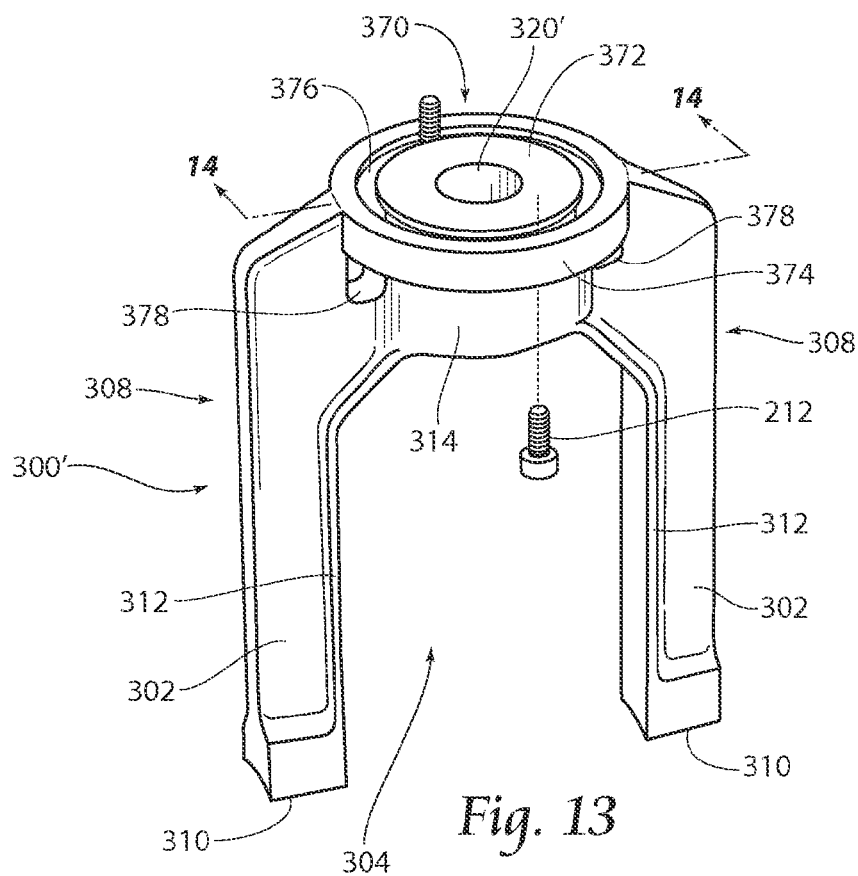
FIG. 13 is a perspective view of an alternative embodiment of a tool yoke according to the present invention, including an integral coupling disk.
Figure 14:
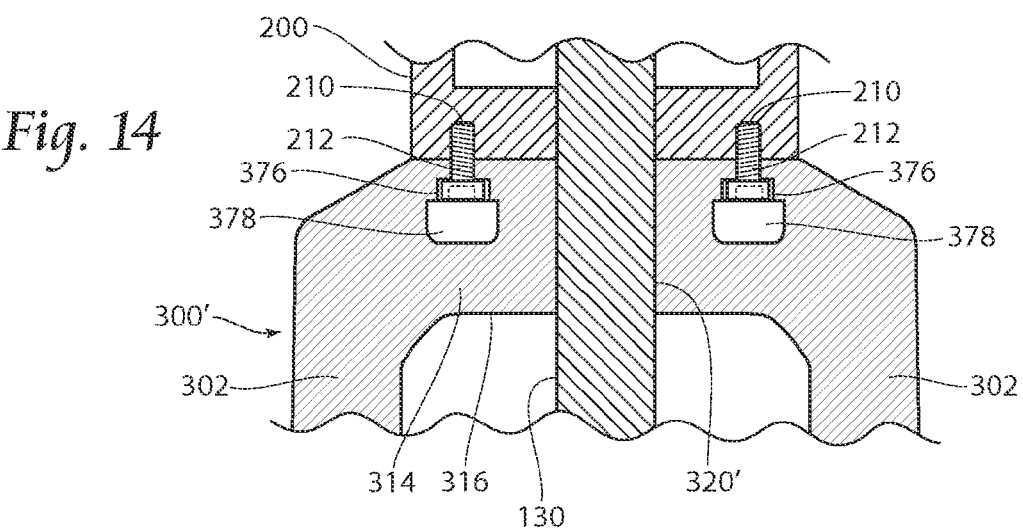
FIG. 14 is a cross-sectional view taken along line 14-14 of FIG. 13.

An alternative yoke 300' is shown in FIG. 13. This yoke 300' is similar to the first yoke embodiment 300, except that the functionality of the coupling disk 400 has been incorporated. Specifically, a coupling disk 370 has been provided as integrally formed with the yoke bridge 314, including a central pedestal member 372 disposed about the yoke throughbore 320'. The disk 370 further includes an annular ring 374 spaced from the pedestal member 372 by a circumferential countersunk slot 376. The countersunk slot 376 serves the same function as the countersunk slots 412,414 previously discussed, but it 376 provides for 360 degrees of rotational positionability of the cylinder 202. Relief slots 376 may be provided on diametrically opposed sides of the pedestal member to allow access to the threaded fasteners 212 to securely couple the cylinder 202 to the yoke 300' in any position throughout the 360 degrees of rotation allowed. FIG. 14 shows the coupling of the alternative yoke 300' to the actuator 200, further showing the pulling shaft 130 extended therethrough for operation. The yoke 300' is preferably formed as a unitary member cast of or machined from a metal material, such as steel or cast iron.

Figure 15:
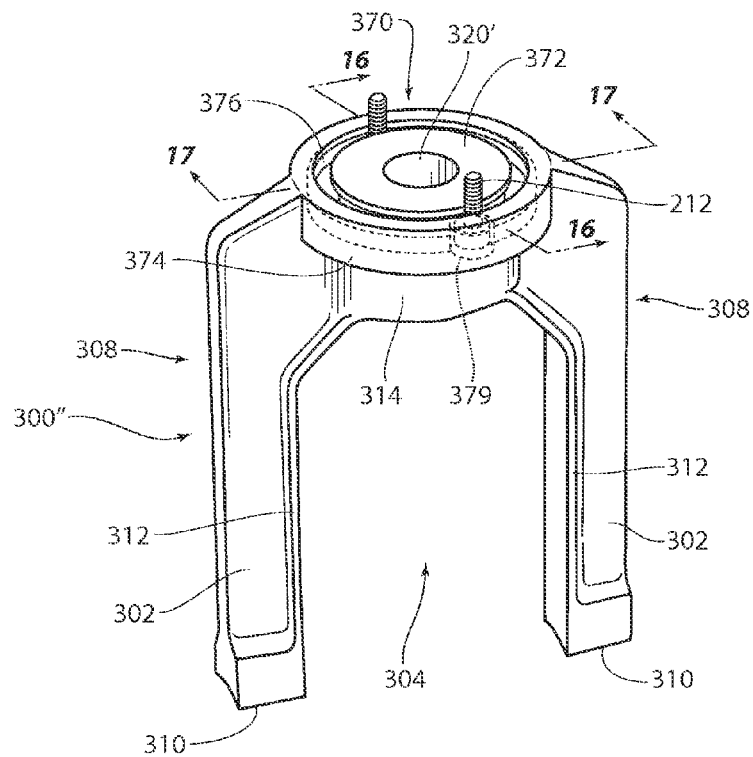
FIG. 15 is a perspective view of a second alternative embodiment of a tool yoke according to the present invention, including an integral coupling disk.
Figure 16:
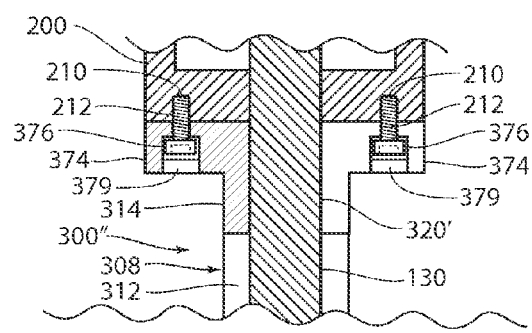
FIG. 16 is a cross-sectional view taken along line 16-16 of FIG. 15.
Figure 17:
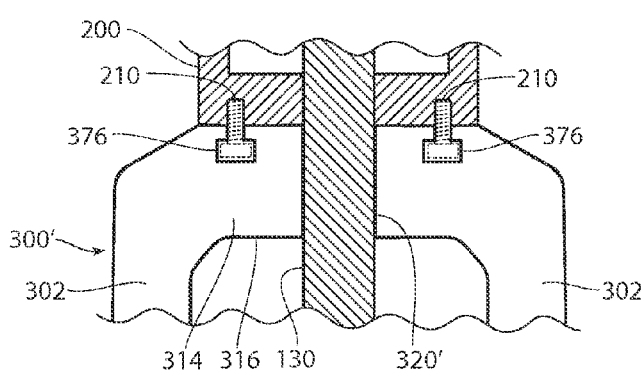
FIG. 17 is a cross-sectional view taken along line 17-17 of FIG. 15.

FIGS. 15-17 show another alternative yoke 300" according to the present invention. Like the first alternative yoke 300', the functionality of the coupling disk 400 has been incorporated. Specifically, a coupling disk 370 has been provided as integrally formed with the yoke bridge 314, including a central pedestal member 372 disposed about the yoke throughbore 320'. The disk 370 further includes an annular ring 374 spaced from the pedestal member 372 by a circumferential countersunk slot 376. The countersunk slot 376 is formed through the top surface of the disk 370, but preferably, in this embodiment 300", does not extend through the bottom surface of the disk 370. Rather, access for threaded fasteners 212 may be provided by way of one or more holes 379 extending into the slot 376, preferably through the bottom surface of the disk 370. If a plurality of holes 379 are used, they may be advantageously disposed at locations to intersect the slot 376 equi-circumferentially disposed about the throughbore 320'. The slot 376 serves substantially the same function as the countersunk slots 412,414 previously discussed, but it 376 provides for 360 degrees of rotational maneuverability of the cylinder 202. FIGS. 16-17 show the coupling of the alternative yoke 300' to the actuator 200, further showing the pulling shaft 130 extended therethrough for operation. The yoke 300" is preferably formed as a unitary member cast of or machined from a metal material, such as steel or cast iron.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A device comprising:
   a yoke having a first longitudinal leg and a second longitudinal leg coupled by a bridge member;
   wherein the first longitudinal leg extends from a first free foot end to a first mounted hip end, the first free foot end including a first terminal foot surface;
   wherein the second longitudinal leg extends from a second free foot end to a second mounted hip end, the second free foot end including a second terminal foot surface;
   wherein the bridge member couples the first mounted hip end to the second mounted hip end;
   wherein the first longitudinal leg is disposed at least substantially parallel to and spaced diametrically across a gap from the second longitudinal leg;
   a puller having a first end, a second end, a cup disposed at the first end and being longitudinally moveable along a pulling axis within the gap, the pulling axis being at least substantially parallel to the first and second longitudinal legs, a shaft extending through the cup and through the bridge member towards the second end along the pulling axis, and a knob coupled to the shaft, the knob having an engagement surface;
   a powered actuator coupled to the bridge member, the powered actuator interfacing the puller so as to draw the cup towards the bridge member.

2. A device according to claim 1, wherein the knob is threadably engaged with the shaft.

3. A device according to claim 1, wherein the engagement surface of the knob is at least substantially planar.

4. A device according to claim 1, wherein the powered actuator is a linear actuator disposed on a first side of the bridge member, and the first and second longitudinal legs extend from a second side of the bridge member opposite the first side.

5. A device according to claim 1, wherein the powered actuator is a fluid powered actuator.

6. A device according to claim 5, wherein the fluid is at least one of air, water, and oil.

7. A device according to claim 1, the actuator comprising:
   a piston moveable along the pulling axis from a first position to a second position through a pulling distance, wherein the first position is closer to the bridge than the second position, wherein the piston is adapted to cooperate with the knob to cause the cup to travel the pulling distance.

8. A device according to claim 7, the actuator further comprising:
a cylindrical housing rotatable about the pulling axis, the housing being coupled to the yoke by a plurality of threaded fasteners extending through a coupling disk integrally formed with the yoke.

9. A device according to claim 7, the piston having a substantially planar engagement surface disposed perpendicular to a throughbore situated coaxial to the pulling axis, the engagement surface abutting the knob.

10. A kit comprising:
a disk circumferentially formed about a central axis, the disk having a plurality of mounting throughholes formed parallel to the central axis and a slot formed through the disk;
a powered actuator having a mounting aperture;
a plurality of mounting fasteners, each configured to be inserted through one of the mounting throughholes;
an actuator mounting fastener configured to be inserted through the slot and be threadingly engaged with and bottom out in the mounting aperture,
thereby supporting the disk on the powered actuator and providing adjustment of the disk with respect to the actuator, the adjustment being at least partially limited by the actuator mounting fastener in cooperation with the slot.

11. A kit according to claim 10, further comprising:
a second slot formed through the disk; and
a second actuator mounting fastener configured to be inserted through the second slot and be threadingly engaged with and bottom out in a second mounting aperture formed in the powered actuator so as to be moveable within the second slot.

* * * * *